(12) United States Patent
Chen et al.

(10) Patent No.: US 7,626,937 B2
(45) Date of Patent: Dec. 1, 2009

(54) SYSTEM AND METHOD FOR NETWORK CONNECTION DETECTION

(75) Inventors: Jin-Ru Chen, TaiChung (TW); Chun-Feng Liu, Taipei (TW)

(73) Assignee: Realtek Semiconductor Corp., Science Park, Hsinchu (TW)

( * ) Notice: Subject to any disclaimer, the term of this patent is extended or adjusted under 35 U.S.C. 154(b) by 1078 days.

(21) Appl. No.: 10/630,789

(22) Filed: Jul. 31, 2003

(65) Prior Publication Data

US 2004/0037308 A1    Feb. 26, 2004

(30) Foreign Application Priority Data

Aug. 6, 2002    (TW) .............................. 91117615 A

(51) Int. Cl.
*G01R 31/08* (2006.01)
(52) U.S. Cl. ...................... 370/241; 370/244; 370/245; 370/248; 370/252; 370/236; 370/346; 370/449; 370/439; 709/245; 709/227; 709/237
(58) Field of Classification Search ......... 370/241–252, 370/236, 449, 346, 439; 709/224, 245, 227, 709/228, 229, 237
See application file for complete search history.

(56) References Cited

U.S. PATENT DOCUMENTS

| | | | | |
|---|---|---|---|---|
| 6,081,503 A * | 6/2000 | Bordogna et al. | ........... | 370/222 |
| 6,137,782 A * | 10/2000 | Sharon et al. | ............... | 370/255 |
| 6,538,997 B1 * | 3/2003 | Wang et al. | ................. | 370/241 |
| 6,741,575 B1 * | 5/2004 | Zhang et al. | ................ | 370/329 |
| 7,010,595 B2 * | 3/2006 | Wu | ............................ | 709/224 |
| 7,046,666 B1 * | 5/2006 | Bollay et al. | ................ | 370/392 |
| 2001/0025314 A1 * | 9/2001 | Matsumoto et al. | ......... | 709/227 |
| 2002/0052972 A1 * | 5/2002 | Yim | ........................... | 709/245 |
| 2003/0165160 A1 * | 9/2003 | Minami et al. | .............. | 370/466 |
| 2004/0128398 A1 * | 7/2004 | Pettey | ........................ | 709/249 |
| 2005/0152271 A1 * | 7/2005 | Rindborg et al. | ............ | 370/230 |
| 2005/0160174 A1 * | 7/2005 | Ingmar et al. | ............... | 709/228 |
| 2005/0190775 A1 * | 9/2005 | Tonnby et al. | .............. | 370/401 |
| 2006/0031488 A1 * | 2/2006 | Swales | ....................... | 709/224 |

* cited by examiner

*Primary Examiner*—Aung S Moe
*Assistant Examiner*—Christopher P Grey

(57) ABSTRACT

The present invention provides a system and method that operates in the link layer and detects connection status in a LAN. The system includes a request frame whose source address is an address of a node transmitting the request frame, a reply frame whose destination address is the source address of the request frame, and a first node and a second node within the LAN for processing the request/reply frame. The method includes the first node transmitting a request frame into the LAN, the second node transmitting a reply frame to the first node if receiving the request frame, and the first node checking whether a destination address of the reply frame comprises an address of the first node when receiving the reply frame. If so, the connection between the first and second nodes is in a normal state.

12 Claims, 4 Drawing Sheets

SYSTEM AND METHOD FOR NETWORK CONNECTION DETECTION

BACKGROUND OF THE INVENTION (a). Field of the Invention

The present invention relates in general to a system and method for network connection detection, and more particularly to a system and method that operate in a link layer to detect connection status of a local area network (LAN) by transceiving control frames.

(b). Description of the Prior Arts

For network users, especially network administrators, it is necessary to confirm that network devices operate normally and physical network connection between them is maintained. Loopback test is commonly used to determine whether hardware of network devices, such as network interface card (NIC) or network switch operate normally. The loopback test for the media access control (MAC) layer of the link layer (Layer 2) is performed by configuring registers of the network devices by software drivers and transmitting signals from the Transmitter to the Receiver. However, when detecting whether the connection between a NIC and a hub or Layer 2 switch is maintained, only the software program (e.g. common used Ping program) is used to send IP packets of the Network layer (Layer 3) to some remote host for connection detection. If no response is received after sending the IP packets, there are several possible causes: network cable or the connected Layer 2 switch may go wrong, one or some routers of the network are disable to forward packets, the remote host does not power up, etc. However, more information is not offered to determine what is the specific cause for the network disconnection.

In view of this, the present invention provides a system and method for detecting connection status between two network devices (e.g. a NIC and a Layer 2 switch, or two NICs) within the network by transceiving Layer 2 packets, i.e. request frames and reply frames, thereby facilitating to find the status of network disconnection.

SUMMARY OF THE INVENTION

The primary object of the present invention is to provide a system that operates in the link layer and detects connection status in a LAN. The system includes a request frame whose source address is an address of a node transmitting the request frame. The system also includes a reply frame whose destination address is the source address of the request frame. The system also includes a first node and a second node that are located in the LAN and capable of processing the request frame and the reply frame.

Compared to echo request and echo reply messages of ICMP, transceived in Layer 3 and with an operating scope of the Internet, the system applies Layer 2 control frames in the frame of this invention to all network devices, such as the first and second nodes mentioned above, within the same LAN or broadcast domain. Without need of IP addresses, these network devices employ only Layer 2 MAC addresses to transceive the request frame and the reply frame for detecting connection states. When the first or second node receives a request frame of this invention, it would generate the reply frame of this invention to the node transmitting the request frame, thereby confirming that the connection is normal.

The secondary object of the present invention is to provide a method for network connection detection using the above system. The method includes the first node transmitting a request frame into the physical medium, and the second node transmitting a reply frame to the first node, if receiving the request frame. The method also includes the first node checking whether a destination address of the reply frame comprises an address of the first node when receiving the reply frame. If so, the connection between the first and second nodes is in a normal state. In an embodiment, the checking is performed only when the first node receives the reply frame within a predetermined period of response time after transmitting the request frame. And if the destination address of the reply frame does not comprise the address of the first node, the reply frame is not valid for the fist node and the first node would re-transmit the request frame to repeat the whole process. In this way, it can be confirmed that the cause of no response is that the connection is broken or in other abnormal conditions, such as network congestion.

DETAILED DESCRIPTION OF THE PRESENT INVENTION

Figure 1:
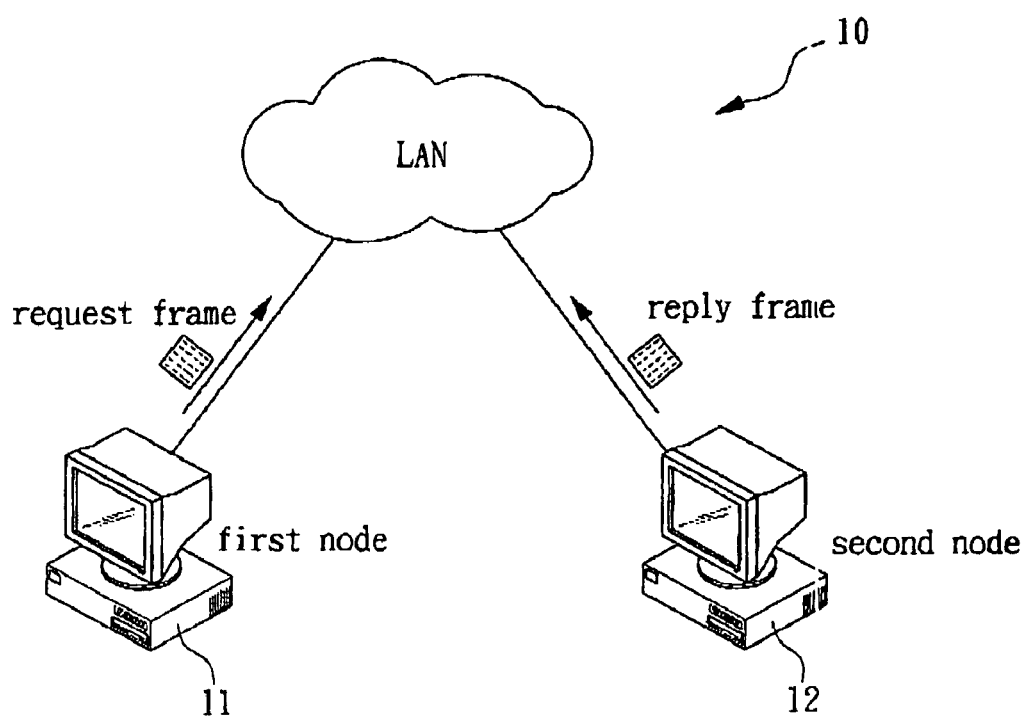
FIG. 1 is a diagram showing a system for network connection detection according to the present invention.

FIG. 1 is a diagram showing a system for network connection detection according to the embodiment of the present invention. The system operates in the link layer (Layer 2) to detect connection status within a LAN 10. The system includes a request frame whose source address is an address of a first node 11 transmitting the request frame, and a reply frame whose destination address is the source address of the request frame. The system also includes the first node 11 and a second node 12 that are located in the LAN 10 and capable of forming and analyzing the request frame and the reply frame. Here the "node" refers to a network device used in the LAN 10, such as a NIC or network switch.

First Embodiment

Figure 2:
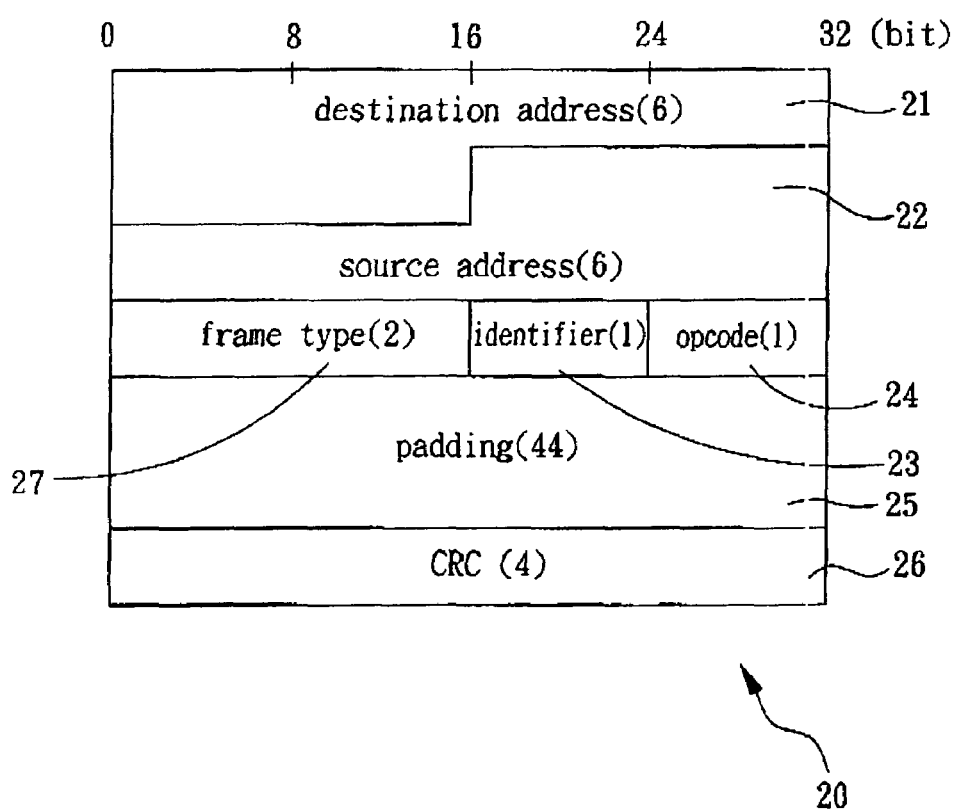
FIG. 2 is a block diagram of a frame format used in the first embodiment of the system for network connection detection according to the present invention.

FIG. 2 is a block diagram of a frame format 20 used in the first embodiment of the present invention. In FIG. 2, the number in the brackets of each field represents the size of the field by bytes. As shown in FIG. 2, the frame format 20 includes below fields:

Destination address 21: the "address" is referred to the Ethernet MAC address and contains six bytes. If a request frame is transmitted toward a specific node, the destination address 21 of the request frame is filled with the MAC address of the specific node; if the request frame is not transmitted toward a specific node, the destination address 21 is filled with a broadcast address FF:FF:FF:FF:FF:FF. In a reply frame, the destination address 21 is filled with the source address of the request frame received previously.

Source address 22: the source address 22 of a request/reply frame is filled with the MAC address of the node transmitting the request/reply frame. But when the node is a network switch and is supposed to hide itself or without the MAC address, the source address 22 of the reply frame is filled with FF:FF:FF:FF:FF:FF.

Identifier 23: filled with a predetermined value to indicate that the frame containing this identifier 23 supports the system for network connection detection.

Opcode 24: filled with a first/second value to indicate that the frame containing this opcode 24 is a request/reply frame.

Padding 25: 44 bytes long and containing all zeros. This field is added to form a minimal Ethernet frame (64 bytes).

Cyclic redundancy check (CRC) 26: used to verify the correctness of the frame.

Frame type 27: used to indicate the protocol that the frame conforms to.

According to a node (e.g. the first node 11 or second node 12) transmitting/receiving a request/reply frame, the operation of the first embodiment is described as follows:

(1) transmitting the request frame: the node forms the request Same in the format 20 of FIG. 2, and sends it into the LAN 10. If the node does not receive a reply frame within a predetermined response time period after sending the request frame, it means that the network is in a disconnected state.

(2) receiving the request frame: when the node receives the request frame in the format 20, it sends out a reply frame in response. If the node is a switch, the request frame received from a port would not be forwarded to any other ports, and the switch is supposed to reply to the request frame whose destination address 21 is a broadcast address (i.e. FF:FF:FF:FF:FF:FF). In addition, it is configurable about whether the switch replies to the request frame whose destination address 21 is the MAC address of the switch. If the node is a NIC, then it only replies to the request frame whose destination address 21 is the MAC address of the NIC itself.

Furthermore, for a NIC not supporting the system, it would drop any received request frame, and for a switch not supporting the system, it would consider a received request frame as a Layer 2 broadcast frame and broadcast it to all ports of the switch. Therefore, if there are at least two devices (NIC or switch) that connect to the switch and support the system, the device transmitting the request frame can still receive the reply frame though the switch does not support the system.

(3) transmitting the reply frame: when the node receives a request frame, it forms a reply frame in the format 20 to send out.

(4) receiving the reply frame: when the node receives the reply frame, it checks whether the destination address 21 of the reply frame is the MAC address of the node itself. If so and if the node has ever transmitted a request frame within the response time period, then there exists another node supporting the system in the LAN 10, and the physical transmission and reception between these two nodes is normal. The node is considered as receiving a valid reply frame under two situations described below:

a. the node has transmitted a request frame without specifying the destination address 21 (i.e. broadcasting) within the response time period, and the destination address 21 of the received reply frame is the MAC address of the node itself.

b. the node has transmitted a request frame specifying the destination address 21 (i.e. unicasting) within the response time period, and the destination address 21 and source address 22 of the received reply frame is the MAC address of the node itself and the destination address 21 of the transmitted request frame respectively.

Second Embodiment

Figure 3:
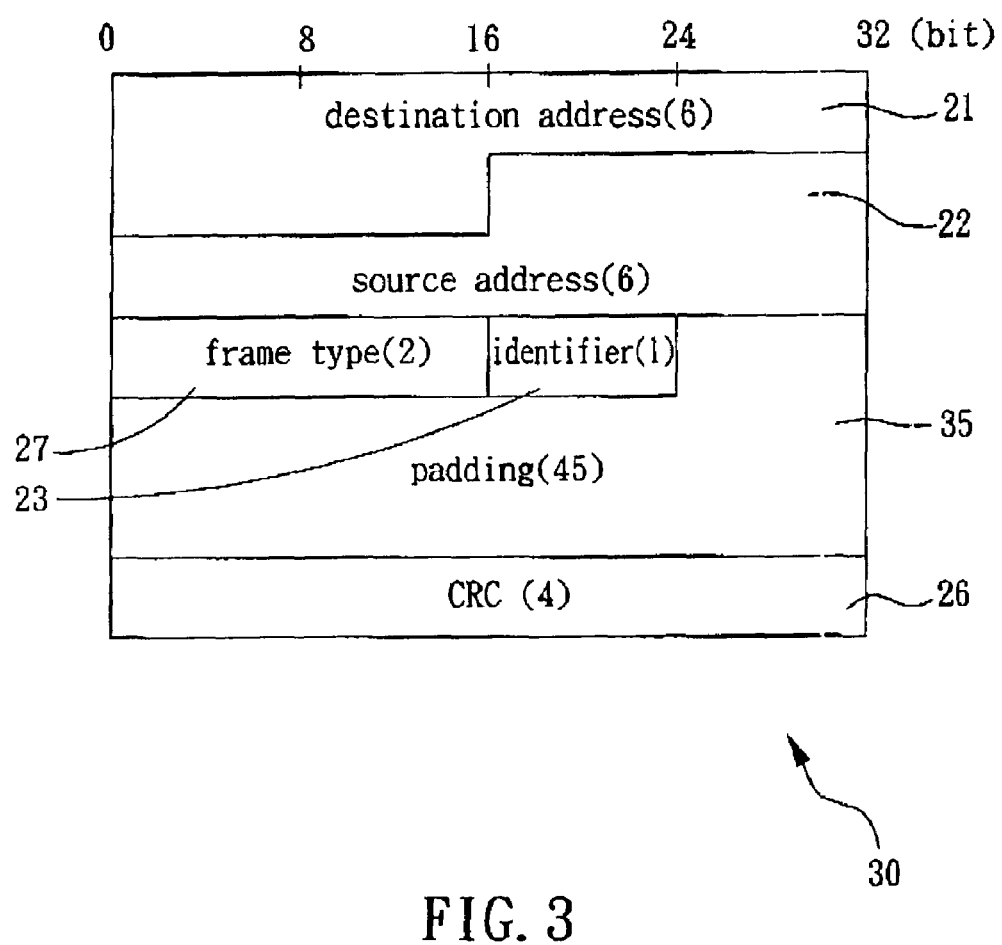
FIG. 3 is a block diagram of a frame format used in the second embodiment of the system for network connection detection according to the present invention.

This embodiment uses only broadcast frames and is not capable of specifying specific MAC addresses. FIG. 3 is a block diagram of a frame format 30 used in the second embodiment of the present invention. The format 30 is similar to the format 20, except the opcode field 24 is incorporated into the padding field 25 in the former.

According to a node (e.g. the first node 11 or second node 12) transmitting/receiving a request/reply frame, the operation of the second embodiment is described as follows:

(1) transmitting the request frame: the node forms the request frame in the format 30 of FIG. 3, and sends it into the LAN 10. If the node does not receive a reply frame within a predetermined response time period after sending the request frame, it means that the network is in a disconnected state. The node can re-transmit a request frame at this time.

(2) receiving the request frame: when the node receives the request frame in the format 30, it sends out a reply frame in response. If the node is a switch, the request frame received from a port would not be forwarded to any other ports. A NIC not supporting the system would drop any received request frame, and a switch not supporting the system would consider a received request frame as a Layer 2 broadcast frame and broadcast it to all ports of the switch. Therefore, if there are at least two devices (NIC or switch) that connect to the switch and support the system, the device transmitting the request frame can still receive the reply frame though the switch does not support the system.

(3) transmitting the reply frame: when the node receives a request frame, it forms a reply frame in the format 30 to send out. A user can determine to enable/disable the feature of transmitting a reply frame automatically.

(4) receiving the reply frame: when the node receives the reply frame, it checks whether the destination address 21 of the reply frame is the MAC address of the node itself. If so and if the node has ever transmitted a request frame within the response time period, then there exists another node supporting the system in the LAN 10, and the physical transmission and reception between these two nodes is normal.

Figure 4:
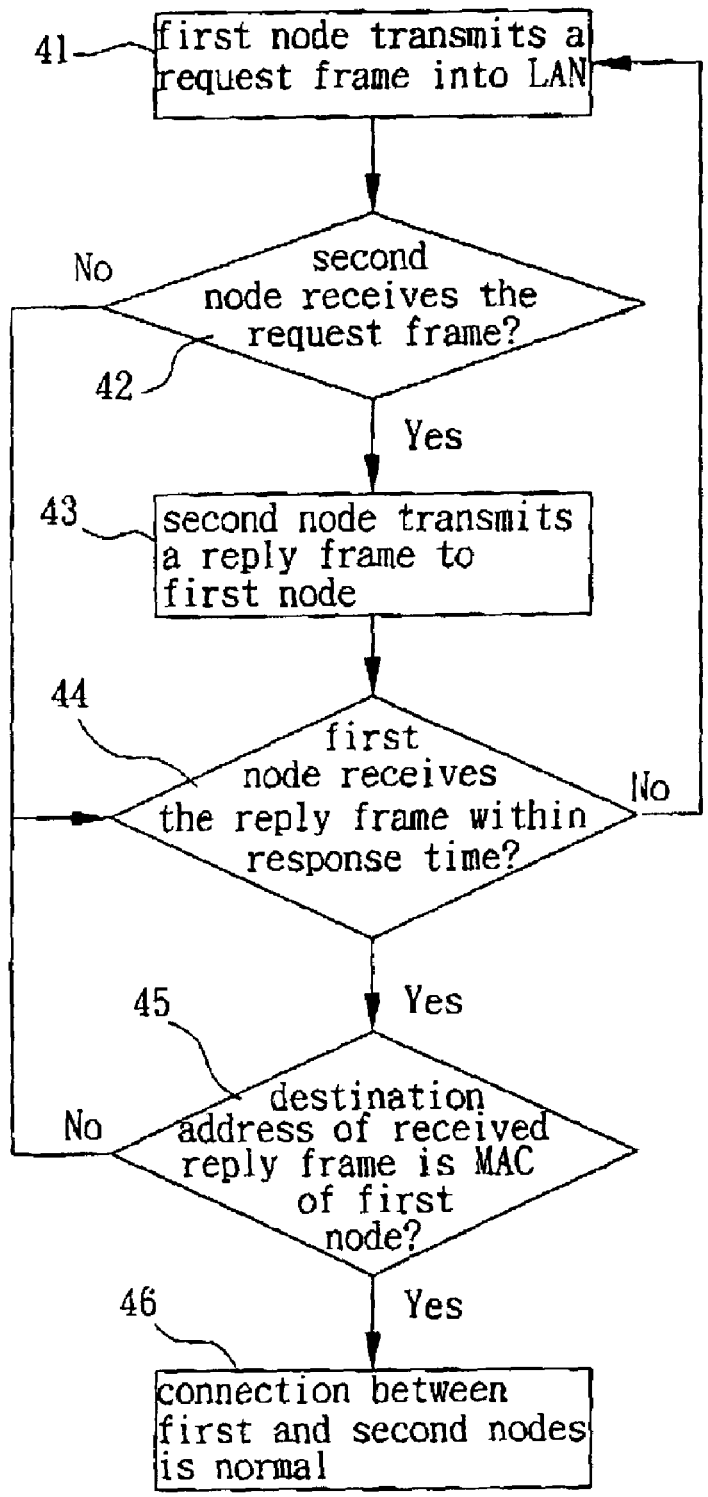
FIG. 4 is a flow chart of the method for detecting connection status according to the present invention.

Next, it would be explained how to utilize the above system to implement the method for network connection detection according to the present invention. The method is adaptable to the first and second embodiments mentioned above. FIG. 4 is a flow chart of the method for detecting connection status in the LAN 10 according to the present invention. As shown in FIG. 4, the flow chart comprises steps of:

41 the first node 11 transmitting a request frame into the LAN 10;

42 the second node 12 checking whether it receives the request frame, if no then jumping to step 44;

43 the second node 12 transmitting a reply frame to the first node 11;

44 the first node 11 checking whether it receives a reply frame within a predetermined response time period after transmitting the request frame, if no then jumping to the step 41;

45 the first node 11 checking whether the destination address 21 of the received reply frame is the MAC address of the first node 11, if no then jumping to the step 44; and

46 the connection between the first node 11 and the second node 12 being normal.

In the step 44, if the first node 11 does not receive the reply frame within the response time period, then the flow returns to the step 41 to re-transmit a request frame. By testing network connection repeatedly, it can be confirmed that the cause of no response is that the connection is disable or in other abnormal conditions, such as network congestion.

The embodiments disclosed in the present invention are the mechanism and method for use in the Ethernet. It should be noted that the present invention is not limited to the Ethernet. The present invention can be used in other network protocols as well.

While the present invention has been shown and described with reference to two preferred embodiments thereof, and in terms of the illustrative drawings, it should be not considered as limited thereby. Various possible modification, omission, and alterations could be conceived of by one skilled in the art to the form and the content of any particular embodiment, without departing from the scope and the spirit of the present invention.

What is claimed is:

1. A system for detecting a connection status in a network, wherein the network comprises at least a first node and a second node, the system comprising:
    a request frame, transmitted by the first node, including a source address comprising a media access control (MAC) address of the first node; and
    a reply frame, transmitted by the second node after receiving the request frame, including a destination address comprising the MAC address of the first node,
    wherein the first node determines the connection status in a link layer according to whether receiving the reply frame,
    wherein the request frame and the reply frame are formed independent of an IP address,
    wherein if the second node comprises a network interface card (NIC), the second node transmits the reply frame only when a destination address of the received request frame comprises a MAC address of the second node,
    wherein if the second node comprises a network switch, the second node transmits the reply frame when the destination address of the received request frame comprises a MAC broadcast address; if the second node comprises the network switch, the second node selectively transmits the reply frame when the destination address of the received request frame comprises the MAC address of the second node.

2. The system as recited in claim 1, wherein the first node re-transmits the request frame if not receiving the reply frame within a predetermined response time period.

3. The system as recited in claim 1, wherein both a destination address of the request frame and a source address of the reply frame comprise a MAC address of the second node.

4. The system as recited in claim 1, wherein both a destination address of the request frame and a source address of the reply frame comprise a MAC broadcast address.

5. The system as recited in claim 1, wherein both the request frame and the reply frame comprise an opcode for indicating the request frame and the reply frame respectively.

6. The system as recited in claim 1, wherein both the request frame and the reply frame comprise an identifier for indicating supporting the system.

7. The system as recited in claim 1, wherein the network is an Ethernet network.

8. A method for detecting a connection status in a network, wherein a first node and a second node are connected via the network, the method comprising:
    transmitting a request frame to the network by the first node, wherein the request frame includes a source address comprising a media access control (MAC) address of the first node;
    transmitting a reply frame to the network by the second node when the second node receives the request frame, wherein the reply frame includes a destination address comprising the MAC address of the first node; and
    determining, by the first node in a link layer, the connection status according to whether receiving the reply frame,
    wherein the request frame and the reply frame are formed independent of an IP address,
    wherein if the second node comprises a network interface card (NIC), the second node transmits the reply frame only when a destination address of the received request frame comprises a MAC address of the second node,
    wherein if the second node comprises a network switch, the second node transmits the reply frame when the destination address of the received request frame comprises a MAC broadcast address; if the second node comprises the network switch, the second node selectively transmits the reply frame when the destination address of the received request frame comprises the MAC address of the second node.

9. The method as recited in claim 8, wherein the first node determines the connection status through checking whether the reply frame is received within a predetermined response time period after the first node transmits the request frame.

10. The method as recited in claim 9, wherein the first node re-transmits the request frame if not receiving the reply frame within the predetermined response time period.

11. A network apparatus for detecting a connection status in a network, wherein the network apparatus and a second network apparatus are connected via the network, the network apparatus comprising:
    a transmitter for transmitting a request frame to the network, wherein a source address of the request frame comprises a media access control (MAC) address of the network apparatus; and
    a receiver for receiving a reply frame from the second network apparatus, wherein the second network apparatus transmits the reply frame according to the request frame, and a destination address of the reply frame comprises the MAC address of the network apparatus,
    wherein the network apparatus determines the connection status in a link layer according to whether the reply frame is received from the second network apparatus,
    wherein the request frame and the reply frame are formed independent of an IP address,
    wherein if the second network apparatus comprises a network interface card (NIC), the second network apparatus transmits the reply frame only when a destination address of the request frame comprises a MAC address of the second network apparatus,
    wherein if the second network apparatus comprises a network switch, the second network apparatus transmits the reply frame when the destination address of the request frame comprises a MAC broadcast address; if the second network apparatus comprises the network switch, the second network apparatus selectively transmits the reply frame when the destination address of the request frame comprises the MAC address of the second network apparatus.

12. The network apparatus of claim 11, wherein the network apparatus re-transmits the request frame if the reply frame is not received within a predetermined response time period.

* * * * *